March 29, 1960 — W. MANN ET AL — 2,930,450
CLASP BRAKE
Filed July 26, 1955 — 6 Sheets-Sheet 1

INVENTORS.
William Mann
Bernard Maloney
By: Walter L. Schlegel, Jr. Atty.

Witness:

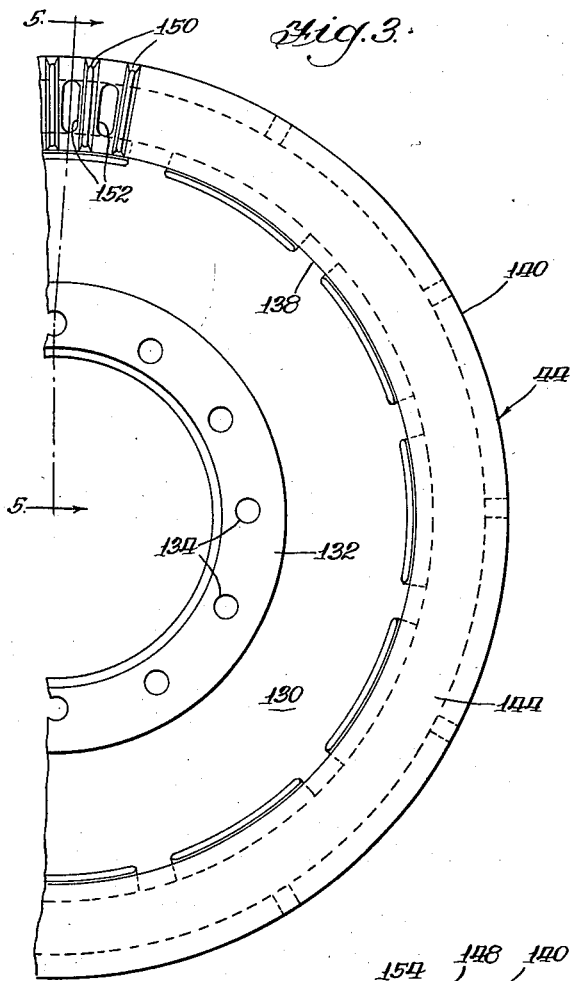

March 29, 1960 W. MANN ET AL 2,930,450
CLASP BRAKE
Filed July 26, 1955 6 Sheets-Sheet 3

Witness:
Richard W. Carpenter

INVENTORS.
William Mann
Bernard Maloney
By Walter L. Schlegel, Jr. Atty.

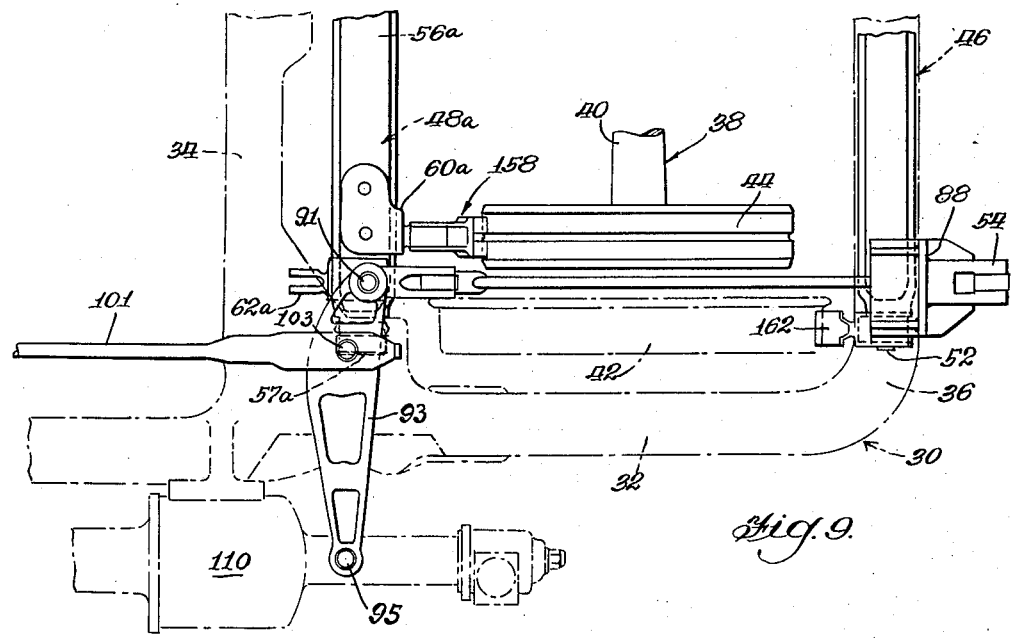
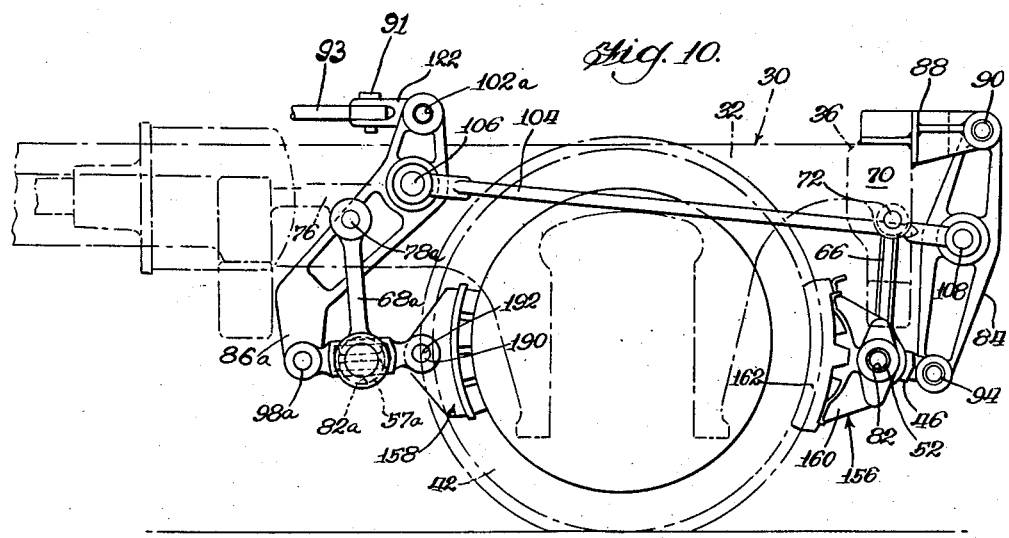

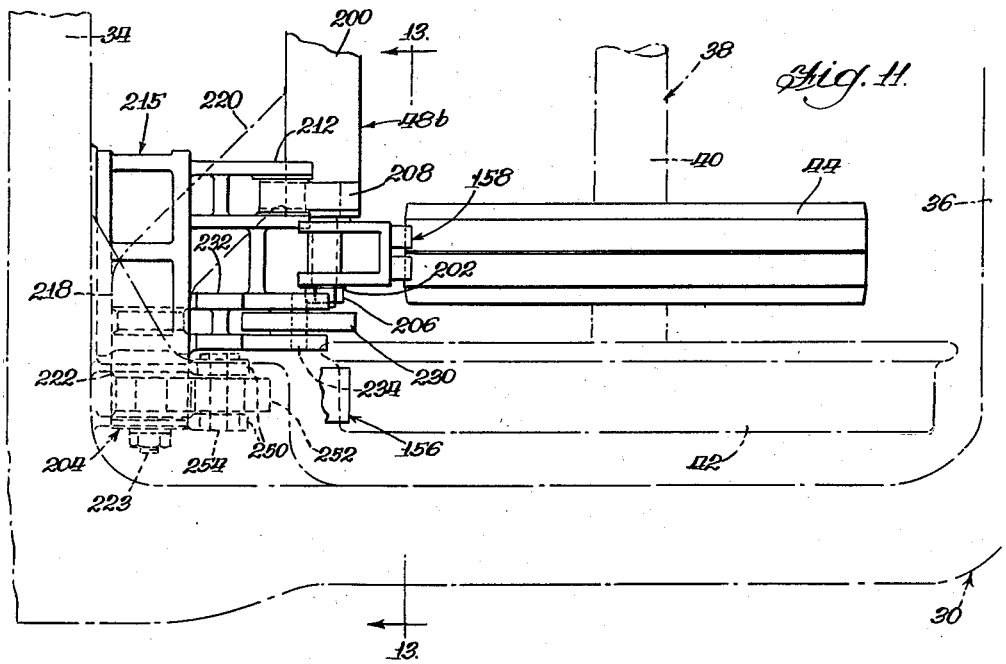
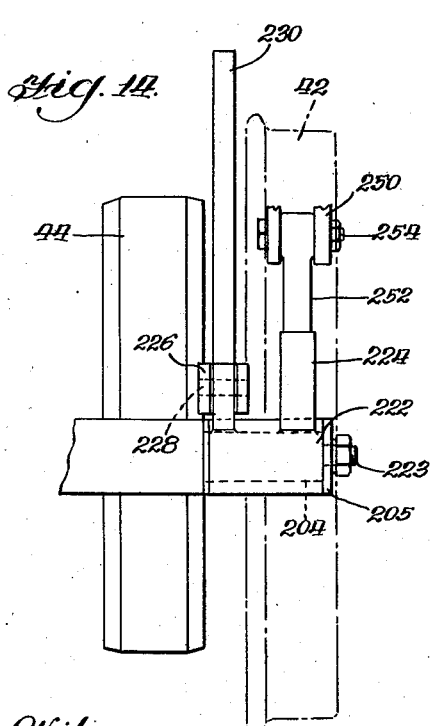
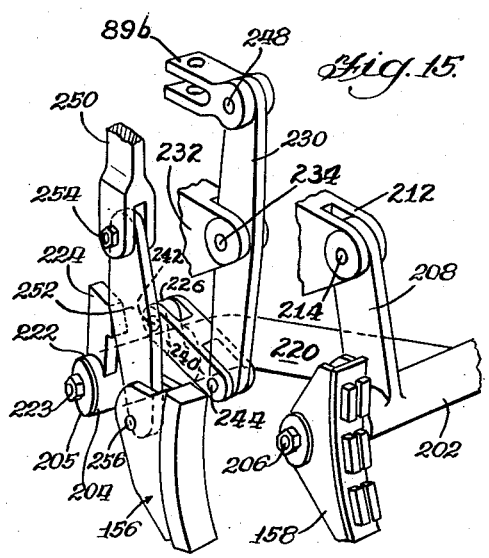

United States Patent Office 2,930,450
Patented Mar. 29, 1960

2,930,450
CLASP BRAKE

William Mann and Bernard Maloney, Gary, Ind., assignors to American Steel Foundries, Chicago, Ill., a corporation of New Jersey Application July 26, 1955, Serial No. 524,548

2 Claims. (Cl. 188—56)

Our invention relates to brakes and more particularly to brakes for a railway car truck.

A general object of the invention is to devise an improved combination brake arrangement which includes both a wheel brake and an off-wheel brake.

Another object of the invention is to provide a combination brake arrangement that will permit wheel and drum brakes to be positioned on the same side or opposite sides of a wheel and axle assembly.

Another object of the invention is the provision of a combination brake employing a novel drum brake shoe so formed as to complementally engage a novel drum or disk.

Another object of the invention is the provision of a brake shoe having a brake surface formed of nonmetallic brake lining pads spaced horizontally and vertically from each other.

Another object of the invention is the provision of a drum or rotor having openings in the center of its outer peripherial wall spaced circumferentially from each other and having fins extending axially outwardly from its side walls.

A more specific object of the invention is to provide a combination brake arrangement wherein spaced pads on the brake shoe engage the outer periphery of the drum on either side of its openings.

Figure 1:
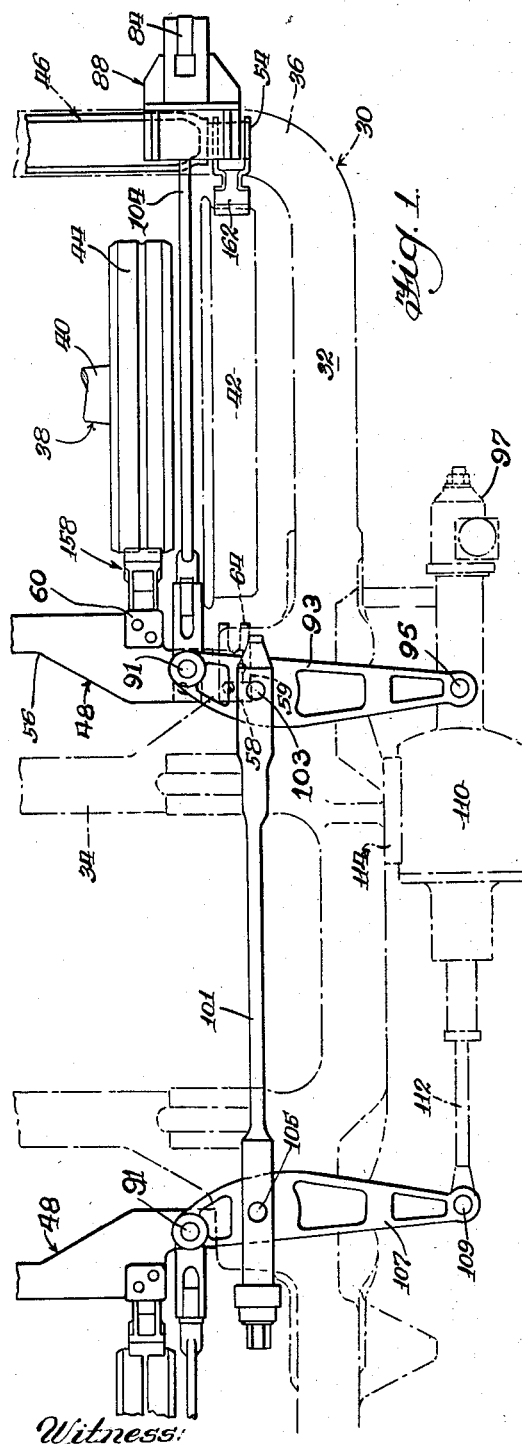
Figure 2:
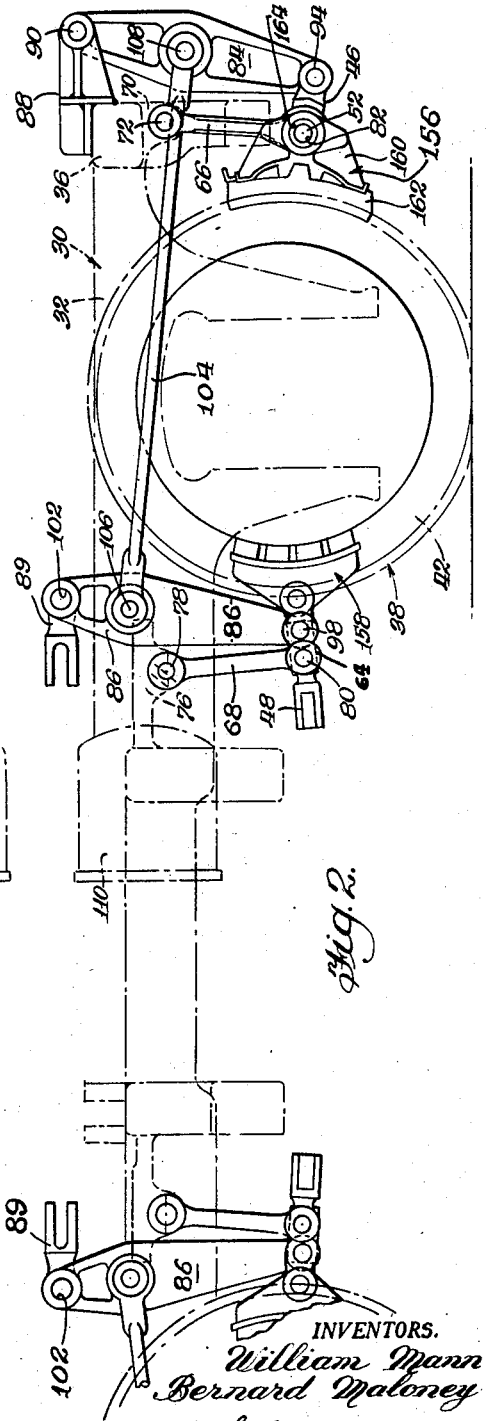
Figure 6:
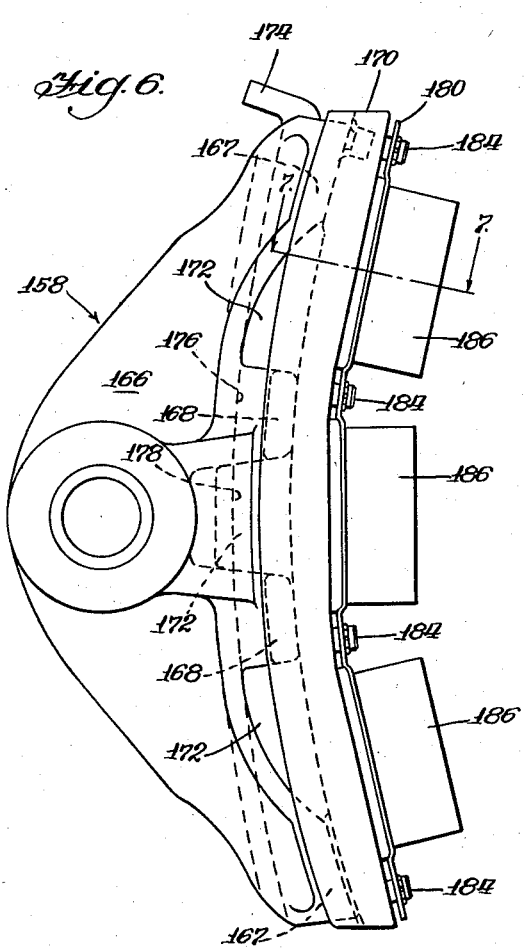
Figure 8:
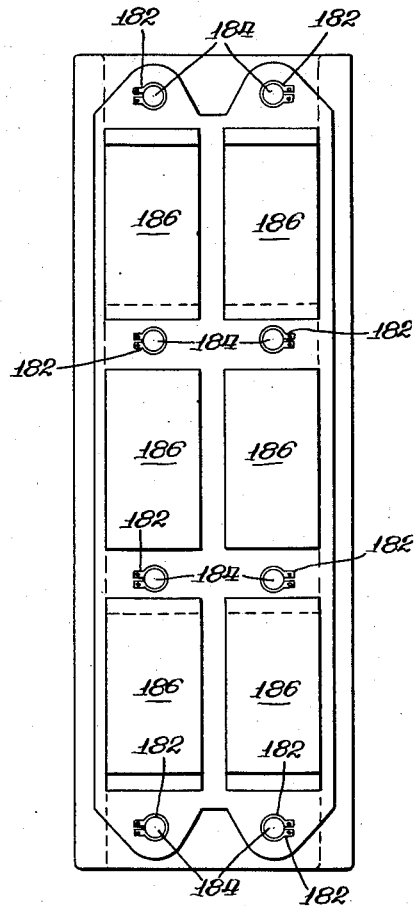
Figure 7:
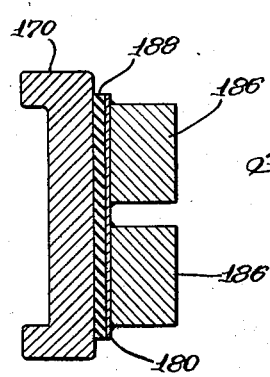
Figure 12:
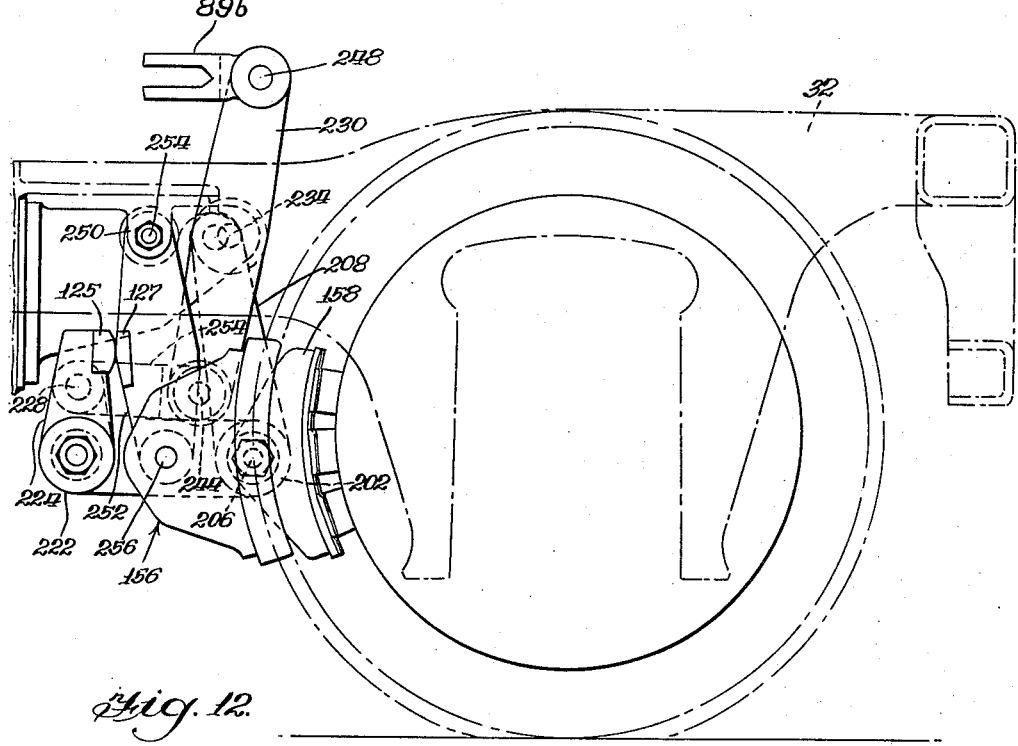
Figure 13:
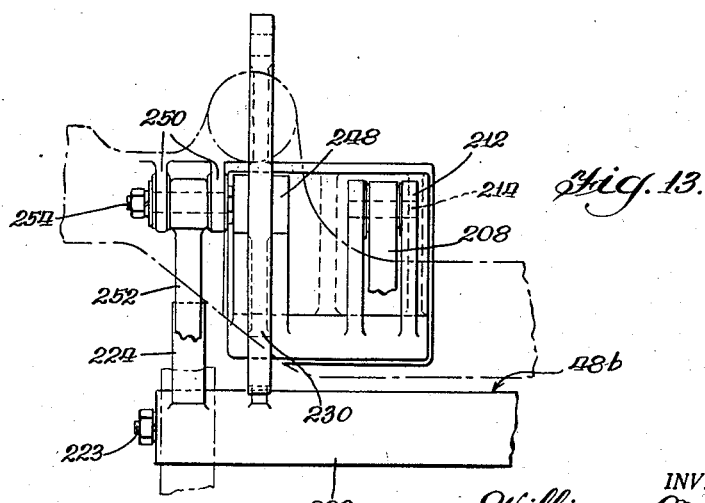

These and other objects of the invention will be apparent from an examination of the following description and drawings, wherein:

Figure 1 is a fragmentary plan view of a railway car truck illustrating one embodiment of our invention (only one half of the truck being shown as the truck is symmetrical about its longitudinal center line), Figure 2 is a side elevational view of the structure illustrated in Figure 1, Figure 3 is a side elevational view of one half of a brake drum, the other half being symmetrical, Figure 4 is an end elevational view of the structure illustrated in Figure 3, Figure 5 is a sectional view taken along the line 5—5 of Figure 3, Figure 6 is a side elevational view of a drum brake shoe assembly, Figure 7 is a partial sectional view taken along the line 7—7 of Figure 6, Figure 8 is an end elevational view of the structure illustrated in Figure 6, Figure 9 is a fragmentary plan view similar to Figure 1, but illustrating another embodiment of the invention, Figure 10 is a side elevational view of the structure illustrated in Figure 9, Figure 11 is a fragmentary plan view similar to Figure 1, but illustrating another embodiment of the invention, Figure 12 is a side elevational view of the structure illustrated in Figure 11, Figure 13 is a fragmentary end elevational view taken along line 13—13 of Figure 11, Figure 14 is an end elevational view of the structure illustrated in Figure 12 as seen from the left, and Figure 15 is a perspective view of part of the structure illustrated in Figure 11.

It will be apparent that certain elements have been intentionally omitted from certain views where they are illustrated to better advantage in other views.

To describe the embodiment of the invention illustrated in Figures 1 to 3, it will be noted that the truck frame indicated generally at 30 comprises spaced side members 32 interconnected by transverse members 34 and end members 36 which are preferably formed integrally with the side members.

The frame may be conventionally supported in a conventional manner (not shown) by a wheel and axle assembly indicated at 38 which comprises an axle 40 and a wheel 42. A drum or disk 44 is secured to the assembly to be rotatable with the wheel.

An outer brake beam 46 and an inner brake beam 48 may be positioned on opposite sides of the wheel and axle assembly and supported from the frame. The outer brake beam 46 preferably comprises a straight center section (not shown) having cylindrical end portions 52 (only one of which is shown) and brake beam brackets 54 positioned adjacent each end portion. The inner brake beam 48 preferably comprises a substantially straight center portion 56 having ends (not shown) and outboard portions 58 having ends 59. The axes of the outboard portions are offset from and parallel to the axis of the center portion 56. Rigidly secured to the ends of the center portion are brake head brackets 60, and rigidly secured to or formed integrally with the outboard end portions 58 are brake lever brackets (not shown) and brake hanger brackets 64, respectively.

The brake beams may be suspended from the frame by outer and inner brake hangers 66 and 68, respectively. The upper end of outer brake hanger 66 may be pivoted by pin 72 to a bracket 70 depending from the frame 30, and the upper end of the inner brake hanger 68 pivoted by pin 78 to bracket 76 depending from the frame. The lower end of inner hanger 68 may be pivoted to inner brake beam bracket 64 by pin 80, and the cylindrical end portion 52 of outer brake beam 46 may be received in aperture 82 of hanger 66.

A pair of vertical brake levers 84 and 86 may be provided on opposite sides of the assembly. The outer brake lever 84 is preferably a dead lever and the inner brake lever 86 a live lever. The upper end of the outer brake lever may be pivoted to a frame bracket 88 by pin 90, and the lower end of the lever may be pivoted to brake beam bracket 54 by pin 94. The lower end of inner brake lever 86 may be pivoted to inner brake beam bracket (not shown) by pin 98.

Inner and outer brake levers 86 and 84 may be interconnected intermediate their respective ends by a pull rod 104 pivoted to the levers by pins 106 and 108, respectively.

The upper end of inner brake lever 86 may be pivoted by pin 102 to a clevis 89 which is fulcrumed at 91 to the inboard end of a generally horizontal actuating lever 93. The outboard end of lever 93 is preferably pivoted by pin 95 to an automatic slack device 97 secured to the power cylinder 110 which may be mounted on the frame by means of a bracket 114.

To actuate the linkage for the other wheel and axle assembly, the actuating lever 107 may be pivoted at its inboard end by a pin 91 to clevis 89 of the left hand inner brake lever 86. The outboard end of the left hand actuating lever is pivoted by pin 109 to a piston rod 112 extending from the power cylinder.

The actuating levers 93 and 107 may be interconnected intermediate their respective ends by a pull rod 101 pivoted to the right and left hand actuating levers by pins 103 and 105, respectively.

Referring now to Figures 3 to 5 of the drawings, it will be seen that the novel drum or disk 44 comprises an annular web 130 having a recessed flat annular center portion 132 provided with circumferentially spaced apertures 134 which serve to secure the drum to the wheel by means of stud bolts (not shown) in a conventional manner. Preferably formed integrally with the outer periphery of the web 130 is a tubular friction member 136 having an outer peripheral wall 140 and an inner peripheral wall 138 which merges with the outer periphery of web 130. Inboard and outboard side walls 142 and 144, respectively, are formed integrally with and connect the inner and outer peripheral walls 138 and 140, respectively, of the member, to form a fluid chamber 154 therebetween.

The inner peripheral wall 138 may be provided with apertures 146 spaced circumferentially of the wall from each other on either or both sides of the web. The outer peripheral wall 140 may be provided with apertures or slots 148 spaced circumferentially of the wall from each other centrally of the wall. The outer sides of walls 142 and 144 may be provided with axially outwardly extending radial fins 150 spaced circumferentially from each other. The walls 144 and 142 are also provided with radial apertures 152 between each of the fins.

Referring again to Figure 1 it will be seen that brake shoe assemblies 156 and 158 are secured to the outer and inner brake beams 46 and 48 to be engageable with the wheel and drum, respectively. The wheel brake shoe assembly 156 may be of the conventional type comprising a brake head 160 having a metallic, preferably cast iron, brake shoe 162 secured thereto in a conventional manner. The brake head 160 may be provided with an aperture 164 in which is received the cylindrical portion 52 of the brake beam 46.

The drum brake shoe assembly 158, illustrated in Figures 6 to 8, is of novel design and preferably comprises a brake head 166 having end lugs 167 and spaced intermediate lugs 168 protruding forwardly therefrom. Brake shoe 170 as shown in Figure 6 is provided with lugs 172 engaging and interlocking the brake head lugs, and is secured to the break head in a conventional manner as by key 174 extending through coaligned apertures 176 and 178 of the head and shoe, respectively. A plate 180 is detachably secured to the face of the brake shoe 170 by means of ring clips 182 and studs 184. A plurality of pads 186 preferably composed of a nonmetallic brake lining material are secured to the plate 180 as by bonding. The pads may be spaced horizontally and vertically of the plate from each other so that the horizontal distance between the pads is substantially equal to the width of the apertures 148 in the outer peripheral wall of the drum plus the lateral motion of the wheel and axle unit. Intermediate the forward face of the brake shoe and the rear face of the plate may be disposed a layer of resilient material 188.

It will be understood that the positions of the wheel and drum brake shoe assemblies may be reversed relative to the inner and outer sides of the wheel and axle assembly.

To describe the operation in the first embodiment, referring to Figures 1 and 2, as the power cylinder is actuated, the piston rod urges the outboard end of left hand actuating lever 107 to the left. As the actuating lever rotates in a clockwise direction about its inner end at point 91, the rod 101 is pulled to the left causing the right hand actuating lever 93 to rotate counterclockwise about pin 95. The movement of the inboard end of the actuating lever 93 carries the upper end of inner brake lever 86 to the left as seen in Figure 2 causing brake lever 86 to pivot counterclockwise about pivot pin 106 and carry the drum brake shoe assembly 158 into engagement with the outer periphery of the drum on the inner side of the wheel and axle assembly.

As brake shoe assembly 158 engages the drum, the pivotal point of brake lever 86 shifts from pin 106 to pivot pin 98 at the lower extremity of the brake lever, and the brake lever continues to rotate counterclockwise about this pin moving the pull rod 104 to the left as seen in Figure 2. As the pull rod moves to the left, it urges the outer brake lever 84 to rotate clockwise about pivot pin 90 and the wheel brake shoe assembly 156 is carried to the left into engagement with the outer periphery of the wheel on the outer side of the wheel and axle assembly.

As the linkage for the right hand wheel and axle assembly tightens, the pivotal point of the left hand actuating lever and the lever continues to rotate in a clockwise direction moving the upper end of the left hand inner brake lever 86, and the linkage for the left wheel and axle assembly is similarly engaged. All of the movements of the brake linkage occur at substantially the same time.

It will be noted that in order to keep the outer periphery of the wheel clean and free of foreign matter, the brake shoe 162 of the wheel brake assembly 156 is of a conventional metallic material such as cast iron.

The novel design of the drum and the complementary design of the drum brake shoe assembly 158 permit the pads which are preferably formed of nonmetallic brake lining material to engage the outer periphery of the rotor on both sides of the apertures 148, thus affording maximum braking contact together with maximum cooling effect.

Referring now to Figures 9 and 10, it will be noted that the parts corresponding to those previously described are identified by corresponding numerals. The embodiment illustrated by these figures is very similar to the first described embodiment with the exception that both inner and outer brake beams are of conventional design, being straight with no offset portions. In order to accommodate its connection to the straight inner brake beam, the brake lever 86a is offset and pivoted to the brake beam bracket 62a by means of pin 98a. The inner brake hanger 68a is formed similar to outer brake hanger 66 of the first embodiment and has its upper end pivoted to side frame bracket 76 by pin 78a. The lower extremity of the brake hanger 68a is provided with an aperture 82a in which is received the cylindrical end portion 57a of the inner brake beam. The operation of the brake linkage is the same as that of the first embodiment.

As may be seen from an examination of Figures 11 through 15 the embodiment illustrated herein is similar to the first described in that an offset inner brake beam is utilized in connection with wheel and drum brakes. In this embodiment, however, both brake shoe assemblies are positioned on the inner side of the wheel and axle assembly. The brake beam 48b is formed somewhat similar to brake beam 48 of the first embodiment and comprises a substantially straight center portion 200, having ends 202, and offset portions 204, having ends 205 which are outboard of center section ends 202.

Drum brake shoe assemblies 158 may be pivotally secured to ends 202 by pins 206. Center portion 200 may be provided inwardly adjacent its ends with an upstanding arm 208 preferably formed integrally therewith. The upper end of arm 208 may be pivotally connected by pin 214 to lugs 212 of frame bracket 215. The axis of each offset portion 204 of the brake beam extends parallel to the axis of the center section 200. Each portion 204 is connected to the center section by intermediate section 220 preferably formed integrally with the offset and center sections.

A cylindrical equalizer sleeve 222 may be rotatably positioned on the offset portion 204 and retained by pin 223. The sleeve 222 may be provided adjacent its outboard end with a preferably integrally formed upstanding bar 224. Spaced inboardly from the bar 224 is an upstanding lug 226 also formed integrally with the sleeve.

Brake beam 48b is positioned at the lower end of a brake lever 230 which is fulcrumed by pin 234 to lugs 232 of frame bracket 215. The lower end of the brake lever may be movably connected to the lug 226 by means of a link 240 which is preferably bifurcated at both ends. One end of the link is pivoted by pin 242 to the sleeve lug and the other end is pivoted by pin 244 to the lower end of the brake lever. The upper end of the brake lever may be pivotally connected to a clevis 89b by pin 248.

Depending from the frame bracket 215 outboardly of lugs 212 and 232 is a third pair of lugs 250. The wheel brake shoe assembly 156 is supported from said bracket by means of hanger 252 having its upper end pivoted by pin 254 to lugs 250 and its lower end pivoted by pin 256 to the wheel brake shoe assembly 156. It will be noted that hanger 252 is in longitudinal alignment with bar 224 of the equalizer sleeve and is abuttably engageable therewith. The bar and hanger may be provided with engaging wear plates 125 and 127, respectively. The clevis 89b may be connected to the power means (not shown) in the same manner as clevis 89 of the first embodiment.

To describe the operation of this embodiment, it will be understood that as clevis 89b is pulled to the left as seen in Figure 15, brake lever 230 is urged to pivot counterclockwise about pin 234. The lower end of the brake lever moves to the right and urges the offset portion of the brake beam through link 240 to the right. As the brake beam moves to the right, the drum brake shoe assembly is directly carried into engagement with the drum. At the same time, bar 224 abuttably engages hanger 252 to urge wheel brake shoe assembly 156 into engagement with the wheel.

The sleeve by being rotatable is operative to take up the difference in the shoe wear between the drum brake shoe and the wheel brake shoe assemblies.

We claim:

1. In a brake arrangement for a railway car having a frame and a supporting wheel and axle assembly including rotatable wheels and drums; the combination of power means, a brake beam positioned on one side of said assembly and extending the width of said car, brake means connected to the ends of said beam and engageable with said wheels, another brake beam positioned on the other side of said assembly and extending the width of said car, brake means on said other beam engageable with said drums, brake hangers pivoted at their upper ends to said frame, and pivoted at their lower ends to the respective brake beams, brake levers pivoted at their lower ends to the respective brake beams and interconnected intermediate their respective ends, one of said levers being a dead lever having its upper end pivoted to the frame and the other of said levers being a live lever having its upper end operatively connected to said power means, the first-mentioned brake means being the sole means for braking the wheels, the second-mentioned brake means being the sole means for braking the drums.

2. In a brake arrangement for a railway vehicle having a frame and a supporting wheel and axle assembly including rotatable wheels and drums, the combination of: power means; a brake beam positioned on one side of said assembly and extending substantially the width of said vehicle; brake means on said beam engageable with said wheels; another brake beam positioned on the other side of said assembly and extending substantially the width of said vehicle; brake means on said other beam engageable with said drums; brake levers pivoted to the respective beams, one of said levers being a dead lever fulcrumed to the frame and the other of said levers being a live lever operatively connected to the power means; and means interconnecting said levers; the first mentioned brake means being the sole means for braking the wheels, the second mentioned brake means being the sole means for braking the drums.

References Cited in the file of this patent

UNITED STATES PATENTS

| | | |
|---|---|---|
| 2,083,910 | Hedgecock | June 15, 1937 |
| 2,155,222 | Farmer | Apr. 18, 1939 |
| 2,386,907 | Pierce | Oct. 16, 1945 |
| 2,416,960 | Simanek | Mar. 4, 1947 |
| 2,451,709 | Baselt | Oct. 19, 1948 |
| 2,473,040 | Schlegal | June 14, 1949 |
| 2,521,988 | McEachran | Sept. 12, 1950 |
| 2,553,824 | Kelly | May 22, 1951 |